Aug. 18, 1964    W. L. MACKIE    3,145,000

LIGHT WEIGHT-HIGH THERMAL RESISTANT AIRFOIL

Filed May 29, 1963

INVENTOR.
WILLIAM L. MACKIE
BY
George F. Ruben
ATTORNEY

United States Patent Office 3,145,000
Patented Aug. 18, 1964

3,145,000
LIGHT WEIGHT-HIGH THERMAL
RESISTANT AIRFOIL
William L. Mackie, Ventura, Calif., assignor to the United States of America as represented by the Secretary of the Navy
Filed May 29, 1963, Ser. No. 284,263
5 Claims. (Cl. 244—123)
(Granted under Title 35, U.S. Code (1952), sec. 266)

The invention described herein may be manufactured and used by or for the Government of the United States of America for governmental purposes without the payment of any royalties thereon or therefor.

This invention relates to aerodynamic structures, and more particularly to a novel construction for an airfoil which has high strength-to-weight ratio and is capable of withstanding aerodynamic heating at supersonic speeds.

In the design and construction of guided missiles and space vehicles it is necessary to design airfoil configurations capable of withstanding flight parameters in excess of Mach 3. Airfoils constructed entirely of metal have been employed in the past but only a few metals are available which will withstand the high aerodynamic heating. The manufacture of such all-metal airfoils are costly, but equally important is the disadvantage that such airfoils are excessively heavy.

The present invention avoids the disadvantage of the prior art by providing an airfoil construction which has a leading edge of an ablative material secured to a main body of an airfoil having a strong, light weight construction. The leading edge of the airfoil is preferably pressure-molded at high temperature from a synthetic resin having incorporated a fibrous material i.e. asbestos reinforced phenolic resin. The main body of the airfoil is a sandwich structure consisting of two outer sheets of a material having a high shear and tensile strength supporting therebetween a core of light weight honeycomb material. The ablative edge is adhesively bonded or otherwise secured to the main body of the airfoil to provide an integral construction.

An important object of this invention is to provide an airfoil that has a high strength-to-weight ratio and is capable of withstanding high aerodynamic heating.

Another object is to provide such an airfoil with an edge of ablative material.

A further object is to provide an airfoil construction that can be assembled by cementing all the components together with structural adhesives.

Other objects, advantages, and novel features of the invention will become apparent from the following detailed description of the invention when considered in conjunction with the accompanying drawings wherein.

Figure 1:
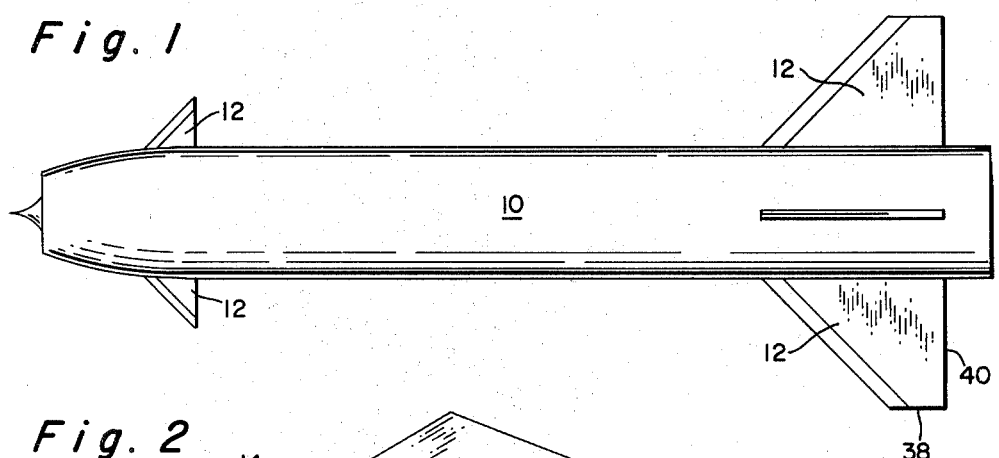
FIG. 1 is an elevation view of a typical guided missile having airfoils constructed according to the teaching of the present invention.

Referring to the drawing where like reference numerals refer to similar parts throughout the drawing there is shown in FIG. 1 a missile 10 of conventional construction having airfoils 12. The term "airfoil" is intended to include any aerodynamic surface such as a wing, rubber or like structure having edges subject to high thermal shock and ablation.

Figure 2:
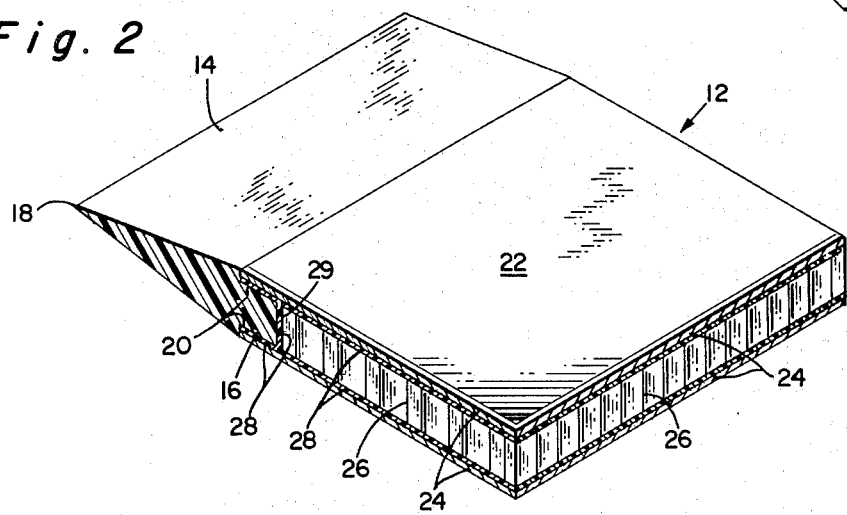
FIG. 2 is a perspective cross-section of one embodiment of the novel airfoil using metal cover plates for a honeycomb core.

One modification of the airfoil according to the invention is illustrated in FIG. 2 wherein the leading edge 14 is a sharp edged, arrow-head configuration constructed of a heat resistant or ablative type material comprising a synthetic thermosetting resin compounded with one of a variety of reinforcing substances.

Examples of a suitable material are as follows:

*Example 1*

35% Phenolic resin
65% Chrysotile asbestos

*Example 2*

35% Phenolic resin
65% Chopped (½" length) silica fibers

*Example 3*

35% Silicone resin
65% Chopped (½" length) silica fibers

*Example 4*

30% Epoxy resin
70% Quartz fiber

In each of the examples cited above the material is molded under a pressure between 3,000 to 10,000 p.s.i. and at a temperature of about 350° F.

The airfoil edge isp rovided with a tang portion 16, at the end opposite to the sharpened edge 18, the tang portion being recessed at shoulders 20 for securing the airfoil edge to the main body 22 of the airfoil presently to be described.

Airfoil body 22 comprises a pair of thin outer load bearing cover plates 24 of a material having a high shear and tensile strength, such as stainless steel, between which is sandwiched a rigid cellular core structure 26 having a high strength-to-weight ratio, such as Fiberglas honeycomb material as is illustrated, or a rigid expanded lightweight material, such as foam plastic.

The cover plates and filler material are structural bonded together by a high temperature resistant epoxy resin adhesive 28. A recessed portion 29 is formed in the filler capable of receiving tang portion 16, with the cover plates 24 being nested on the shoulders 20. The airfoil edge 14 is also cemented to the airfoil body in the above-described assembly by using the same epoxy resin adhesive. In other words, as is shown in FIG. 2, cover plates 24, honeycomb filler 26 and airfoil edge 14 are integrally cemented together by the epoxy resin providing a aerodynamic component of high structural integrity during high speed flight.

Figure 3:
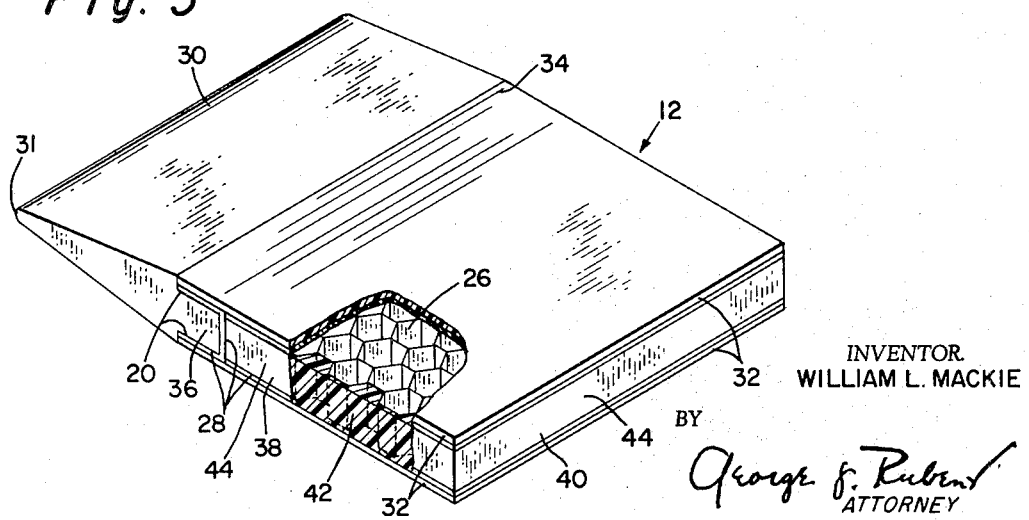
FIG. 3 is a perspective end view partially in cross-section of another embodiment of the novel airfoil wherein the cover plates are of a Fiberglas laminate construction.

FIG. 3 is a cross-section of a sandwiched construction similar to FIG. 2 except that the airfoil edge 30 has a rounded edge 31 rather than a pointed one. Also, the cover plates 32 are laminated Fiberglas impregnated with phenolic resin the Fiberglas fibers being oriented all in the same direction as indicated by reference numeral 34. Honeycomb filler 26 may be one of those materials described with reference to FIG. 2 and cemented between cover plates 32 and to the tang 36 of airfoil edge 30 by epoxy resin adhesive 28.

Where no airfoil edge is desired, such as ends 38 and 40, a flat, smooth edge may be provided by filling the pockets created by the honeycomb with a phenolic resin 42, and the edge ground flat as at 44 or any other configuration desired.

The instant invention provides a novel airfoil construction which has a high strength-to-weight ratio capable of withstanding endothermic pyrolysis and thermal shock during supersonic flight conditions. These characteristics are achieved by providing a sandwiched airfoil body structure of two outer high strength sheets between which is bonded a rigid expanded or cellular structure. A ablative airfoil edge is bonded into the sandwiched construction providing a simple and easy construction.

Obviously many modifications and variations of the present invention are possible in the light of the above

I claim:

1. An airfoil construction suitable for supersonic flight comprising:
    (a) a pair of spaced sheet members having high tensile strength creating an open end adjacent an edge of the airfoil;
    (b) a rigid cellular structure extending between and bonded to said sheet members;
    (c) an airfoil edge secured in said open end between said sheet members;
    (d) said airfoil edge being made of ablative material; whereby said airfoil has a high strength-to-weight ratio and is capable of withstanding high thermal shock encountered in supersonic flight.

2. The airfoil construction of claim 1, wherein:
    (a) the ablative material contains a synthetic resin compounded with reinforcing fibrous material.

3. The airfoil construction of claim 1 wherein the sheet members are constructed of "fiberglas" impregnated with a resin, the fibers being oriented in a predetermined direction.

4. An airfoil construction suitable for supersonic flight comprising:
    (a) a pair of spaced sheet members having high tensile strength creating an open end adjacent an edge of the airfoil;
    (b) a rigid cellular structure extending between and bonded to said sheet members, said structure being recessed along a side to receive an airfoil edge;
    (c) an airfoil edge having a tang portion received in said recess and secured therein;
    (d) said atng having recessed shoulders on opposite whereby said airfoil has a high strength-to-weight ratio and is capable of withstanding high thermal shock encountered in supersonic flight.

5. An airfoil construction suitable for supersonic flight comprising:
    (a) a pair of spaced sheet members having high tensile strength creating an open end adjacent an edge of the airfoil;
    (b) a rigid cellular structure extending between and bonded to said sheet members and being recessed along a side to receive an airfoil edge;
    (c) an airfoil edge having a tang portion received in said recess and secured therein;
    (d) said tang having recessed shoulders on opposite sides to receive the sheet members to be secured therein;
    (e) said airfoil edge being made of ablative material, whereby said airfoil has a high strength-to-weight ratio and is capable of withstanding high thermal shock encountered in supersonic flight.

References Cited in the file of this patent

UNITED STATES PATENTS

| | | |
|---|---|---|
| 2,734,586 | Wright et al. | Feb. 14, 1956 |
| 3,002,567 | Stulen et al. | Oct. 3, 1961 |
| 3,096,958 | Koontz | July 9, 1963 |

OTHER REFERENCES

Space/Aeronautics, February 1962, pages 64–69.

UNITED STATES PATENT OFFICE
CERTIFICATE OF CORRECTION

Patent No. 3,145,000                                      August 18, 1964

William L. Mackie

It is hereby certified that error appears in the above numbered patent requiring correction and that the said Letters Patent should read as corrected below.

Column 4, line 3, strike out "said atng having recessed shoulders on opposite" and insert instead -- said airfoil edge being made of ablative material, --.

Signed and sealed this 26th day of January 1965.

(SEAL)
Attest:

ERNEST W. SWIDER                                    EDWARD J. BRENNER
Attesting Officer                                        Commissioner of Patents